US012669983B2

(12) United States Patent
Wu et al.

(10) Patent No.: US 12,669,983 B2
(45) Date of Patent: Jun. 30, 2026

(54) CODE GENERATION METHOD AND APPARATUS, COMPUTER DEVICE, AND STORAGE MEDIUM

(71) Applicant: Beijing Volcano Engine Technology Co., Ltd., Beijing (CN)

(72) Inventors: Kai Wu, Beijing (CN); Changwen Chen, Beijing (CN); Guitao Ding, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 19/049,533

(22) Filed: Feb. 10, 2025

(65) Prior Publication Data

US 2025/0265048 A1      Aug. 21, 2025

(30) Foreign Application Priority Data

Feb. 20, 2024    (CN) .......................... 202410190526.4

(51) Int. Cl.
G06F 9/44        (2018.01)
G06F 8/35        (2018.01)
G06F 11/3604     (2025.01)

(52) U.S. Cl.
CPC ............ G06F 8/35 (2013.01); G06F 11/3612 (2013.01)

(58) Field of Classification Search
CPC ............................... G06F 8/35; G06F 11/3612
See application file for complete search history.

(56) References Cited

U.S. PATENT DOCUMENTS

| | | | |
|---|---|---|---|
| 2003/0110472 A1* | 6/2003 | Alloing ..................... | G06F 8/71 717/122 |
| 2011/0016347 A1* | 1/2011 | Brodeur .............. | G06F 11/3476 714/2 |
| 2011/0088009 A1* | 4/2011 | Jones ...................... | G06F 9/453 717/100 |
| 2024/0256423 A1* | 8/2024 | Zhang ....................... | G06F 8/71 |
| 2025/0077237 A1* | 3/2025 | Sachindran ............. | G06F 9/451 |

* cited by examiner

*Primary Examiner* — Hang Pan
(74) *Attorney, Agent, or Firm* — Alleman Hall LLP

(57)        ABSTRACT

The present disclosure relates to the field of computer technology, and discloses a code generation method and apparatus, a computer device, and a storage medium. The method includes: obtaining a target generation position of a code to be generated; extracting context code information corresponding to the target generation position, and generating code prompt information matching the context code information; and inputting the code prompt information into a preset code generation model, and generating, by the preset code generation model, target code corresponding to the target generation position. The preset code generation model is pre-trained based on a prompt information sample.

12 Claims, 6 Drawing Sheets

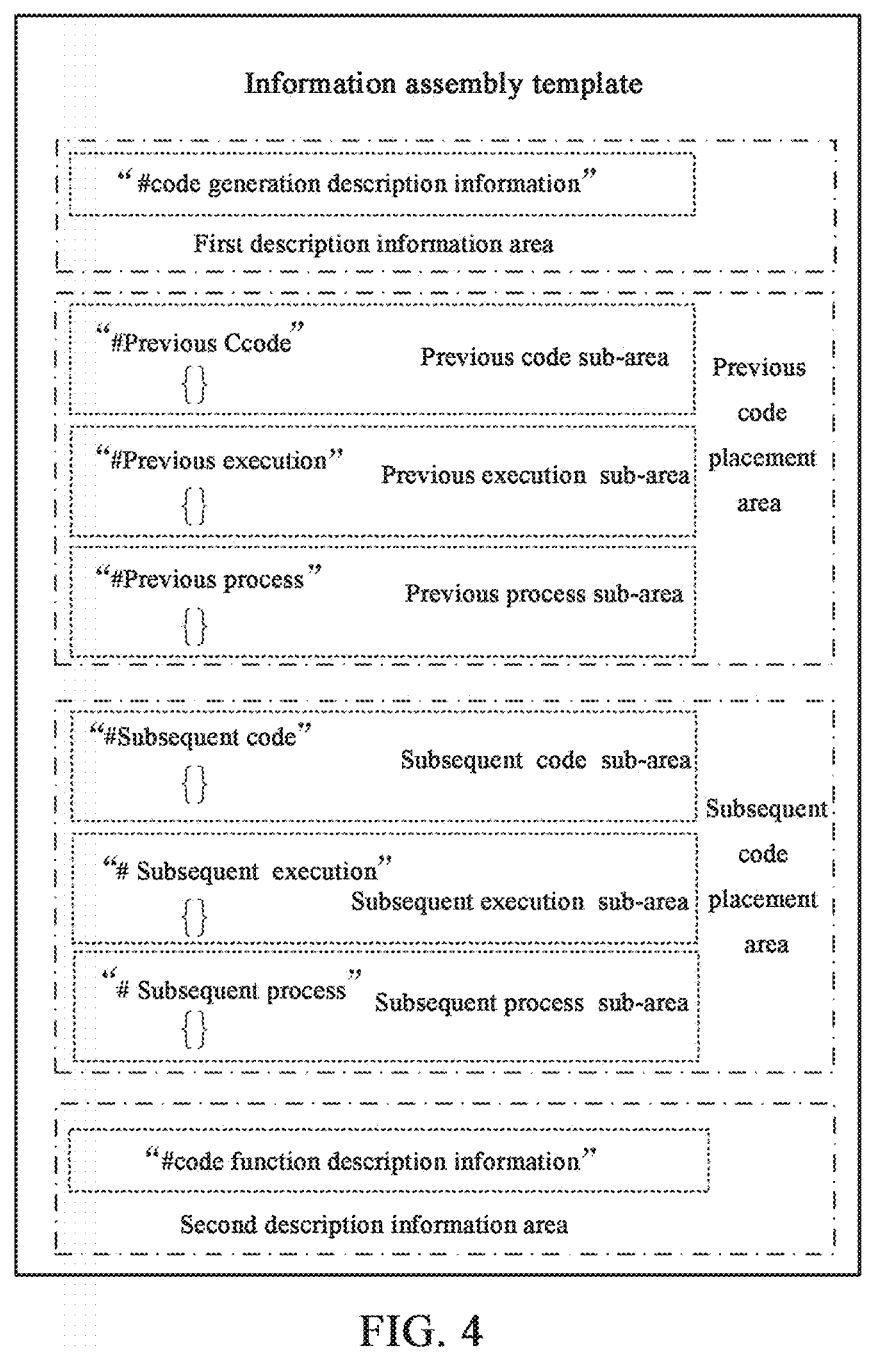

Information assembly template

"#code generation description information"

First description information area

"#Previous Ccode"                    Previous code sub-area          Previous
{}                                                                    code
"#Previous execution"          Previous execution  sub-area           placement
{}                                                                    area
"#Previous process"            Previous process sub-area
{}

"#Subsequent code"                   Subsequent code  sub-area
{}                                                                    Subsequent
"# Subsequent  execution"                                             code
{}                             Subsequent execution  sub-area         placement
"# Subsequent process"         Subsequent process  sub-area           area
{}

"#code function description information"

Second description information area

FIG. 4

CODE GENERATION METHOD AND APPARATUS, COMPUTER DEVICE, AND STORAGE MEDIUM

CROSS-REFERENCE TO RELATED APPLICATION

This application claims priority to Chinese Application No. 202410190526.4 filed on Feb. 20, 2024, the disclosure of which is incorporated herein by reference in its entirety.

FIELD

The present disclosure relates to the field of computer technology, and in particular, to a code generation method and apparatus, a computer device, and a storage medium.

BACKGROUND

In the process of software code writing, developers usually need to write the software code according to requirements and their mastery of related components. However, in the development process, when encountering an unknown field or unfamiliar with a certain component, developers usually use a search engine to search for a solution, which makes the development efficiency relatively low. With the continuous development of natural language models, a code generation tool can automatically generate a corresponding code according to language prompt information or in a part of code, which can greatly improve the development efficiency and quality of the software code.

SUMMARY

In view of this, the present disclosure provides a code generation method and apparatus, a computer device, and a storage medium.

In a first aspect, the present disclosure provides a code generation method, including: obtaining a target generation position of a code to be generated; extracting context code information corresponding to the target generation position, and generating code prompt information matching the context code information; and inputting the code prompt information into a preset code generation model, and generating, by the preset code generation model, target code corresponding to the target generation position. The preset code generation model is pre-trained based on a prompt information sample.

In a second aspect, the present disclosure provides a code generation apparatus, including: an obtaining module, configured to obtain a target generation position of a code to be generated; a prompt information generation module, configured to extract context code information corresponding to the target generation position, and generate code prompt information matching the context code information; and a code generation module, configured to input the code prompt information into a preset code generation model, and generate, by the preset code generation model, target code corresponding to the target generation position. The preset code generation model is pre-trained based on a prompt information sample.

In a third aspect, the present disclosure provides a computer device, including: a memory and a processor. The memory and the processor are communicatively connected to each other, the memory stores computer instructions, and the processor executes the computer instructions to perform the code generation method according to the first aspect or any corresponding implementation thereof.

In a fourth aspect, the present disclosure provides a computer-readable storage medium storing computer instructions thereon. The computer instructions are used to cause a computer to perform the code generation method according to the first aspect or any corresponding implementation thereof.

BRIEF DESCRIPTION OF THE DRAWINGS

In order to more clearly illustrate the technical solutions in the specific embodiments of the present disclosure or in the prior art, the following will briefly introduce the drawings used in the description of the specific embodiments or the prior art. Apparently, the drawings in the following description are some embodiments of the present disclosure, and for those of ordinary skill in the art, other drawings can be obtained according to these drawings without paying creative labor.

FIG. 4 is a schematic diagram of an information assembly template according to an embodiment of the present disclosure;

DETAILED DESCRIPTION OF EMBODIMENTS

In order to make the purpose, technical solutions and advantages of the embodiments of the present disclosure clearer, the technical solutions in the embodiments of the present disclosure will be clearly and completely described below in combination with the drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without paying creative labor belong to the protection scope of the present disclosure.

In the related art, when performing automatic generation of software code, a large language model (LLM) is mainly used to generate a corresponding code or optimize generated code based on prompt description text input by developers. To ensure the accuracy of code generation or optimization, developers need to input a large amount of prompt description text information. However, the input of prompt description text information relies on developers, and even if the developers input more information, it is difficult to avoid information errors caused by human factors. Therefore, it is difficult to ensure the correctness of code generation.

According to the code generation method provided in the embodiments of the present disclosure, the context code information of the target generation position is extracted to generate the corresponding code prompt information according to the context code information, which realizes the automatic generation of the code prompt information without relying on manual input of description information. Moreover, the code prompt information is generated in combination with the context code information, which ensures that the generation of the code prompt information is more accurate. Then, the target code is generated by the preset code generation model according to the code prompt information, thereby improving the generation accuracy and generation efficiency of the target code, and further improving the development efficiency of the software code, which effectively reduces the dependence on developers, and reduces personnel usage costs.

According to the embodiments of the present disclosure, an embodiment of a code generation method is provided. It should be noted that the steps shown in the flowcharts of the drawings may be executed in a computer system such as a set of computer executable instructions. Moreover, although the logical order is shown in the flowcharts, in some cases, the steps shown or described may be executed in an order different from that here.

Figure 1:
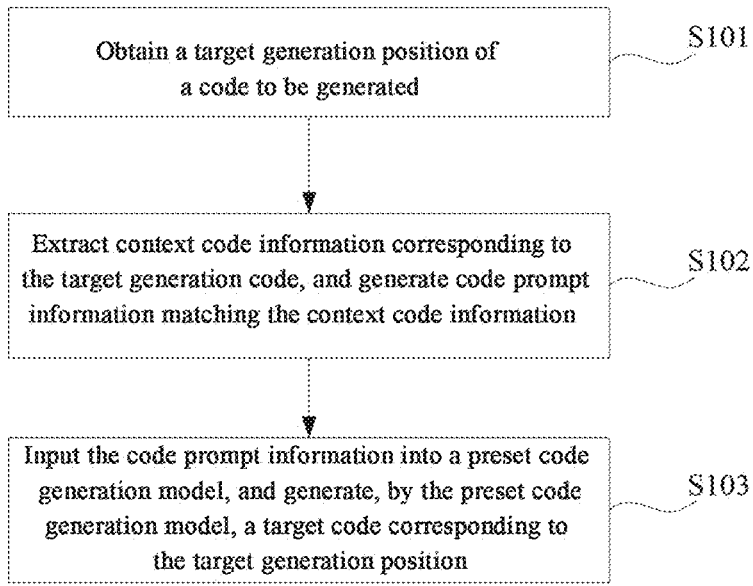
FIG. 1 is a schematic flowchart of a code generation method according to an embodiment of the present disclosure.

In this embodiment, a code generation method is provided, which can be used in computer devices such as computers, laptops, etc. FIG. 1 is a flowchart of a code generation method according to an embodiment of the present disclosure, as shown in FIG. 1, the process includes the following steps:

Step S101, obtaining a target generation position of a code to be generated.

The code to be generated is code to be written according to a function that software needs to implement. Specifically, a code development tool (e.g., Notebook) is deployed in a computer device, and the code development tool has a corresponding code editing page. Developers can develop software code through the code editing page of the code development tool to implement specific functions of the software. The code to be generated may be code in any programming language, such as Python code, SQL code, etc.

The target generation position is a position where the code to be generated is located. Specifically, in the process of writing code by developers through the code editing page, if they encounter an unknown field or are unfamiliar with a certain component, to ensure the development efficiency of the software, a code automatic generation process will be triggered. At this time, the computer device can record the position where the developer stops the code development and triggers a code automatic generation instruction, and determine the position as the target generation position of the code to be generated.

Step S102, extracting context code information corresponding to the target generation position, and generating code prompt information matching the context code information.

The context code information is code information of upper and lower units located at the target generation position, such as variable types, variable contents, output results, etc. in the context code. Specifically, in combination with the target generation position, code content in the upper unit located at the target generation position is parsed to obtain code information in the upper unit, and at the same time, code content in the lower unit located at the target generation position is parsed to obtain code information in the lower unit.

It should be noted that if the target generation position does not have a lower unit, the previous code information corresponding to the target generation position is extracted.

The code prompt information is key text information required for describing code generation. In combination with the context code information, code type, code variable information, code execution information, etc. required for the code to be generated can be determined, and key text information (such as key variable text, key execution result text, etc.) required for the code to be generated is extracted according to the code type, code variable information, code execution information, etc. required for the code to be generated, and the code to be generated is described with the extracted key text information to obtain the code prompt information corresponding to the code to be generated.

Step S103, inputting the code prompt information into a preset code generation model, and generating, by the preset code generation model, target code corresponding to the target generation position.

The preset code generation model is pre-trained based on a prompt information sample.

The preset code generation model is a model trained by taking a prompt information sample as input and code as output, such as a natural language model, a deep learning model, a machine learning model, etc. The specific training process is as follows:

Step 1, obtaining a prompt information sample set, where the prompt information sample set includes a plurality of prompt information samples. The prompt information sample set is a prompt information set for code that implements a specific function collected in advance, and the prompt information sample set includes a plurality of pieces of prompt information in different description manners, which are taken as prompt information samples. Specifically, the prompt information sample set can be obtained by manual input by developers, or can be obtained by online collection, and the manner of obtaining the prompt information sample set is not specifically limited here.

Step 2, for any target prompt information sample in the prompt information sample set, extracting a description sample for generating code from the target prompt information sample, and processing the description sample with the preset code generation model to output prediction code corresponding to the description sample.

Specifically, for any target prompt information sample in the prompt information sample set, semantic recognition and semantic segmentation are performed on it to extract key text information of the target prompt information sample, and the code to be generated is described with the key text information to generate a description sample corresponding to the code to be generated. Then, the description sample is inputted into the preset code generation model for prediction processing, and the prediction code corresponding to the description sample is outputted.

Step 3, comparing the prediction code with actual code corresponding to the target prompt information sample, and generating error information based on a comparison result, so as to adjust the preset code generation model with the error information.

Specifically, the prediction code outputted by the preset code generation model is compared with the actual code corresponding to the target prompt information sample to generate the comparison result. The error information between the prediction code and the actual code is determined through the comparison result, and the preset code generation model is iteratively trained in combination with the error information, so as to realize the adjustment of the preset code generation model, so that the output result of the preset code generation model is more accurate.

Therefore, the training of the preset code generation model is performed in combination with the code prompt information, which realizes the automatic generation of the corresponding code according to the code prompt information.

The target code is code generated according to the code prompt information, which is used to connect with code of upper and lower units of the target generation position to implement corresponding specific functions. Specifically, the preset code generation model that has been trained is deployed in the computer device. After obtaining the code prompt information, the computer device inputs the code prompt information into the preset code generation model to request the preset code generation model to perform automatic code generation. Correspondingly, the preset code generation model can execute a code generation process according to the code prompt information to generate corresponding target code.

According to the code generation method provided in this embodiment, the context code information of the target generation position is extracted to generate the corresponding code prompt information according to the context code information, which realizes the automatic generation of the code prompt information without relying on manual input of description information. Moreover, the code prompt information is generated in combination with the context code information, which ensures that the generation of the code prompt information is more accurate. Then, the target code is generated by the preset code generation model according to the code prompt information, thereby improving the generation accuracy and generation efficiency of the target code, and further improving the development efficiency of the software code.

Figure 2:
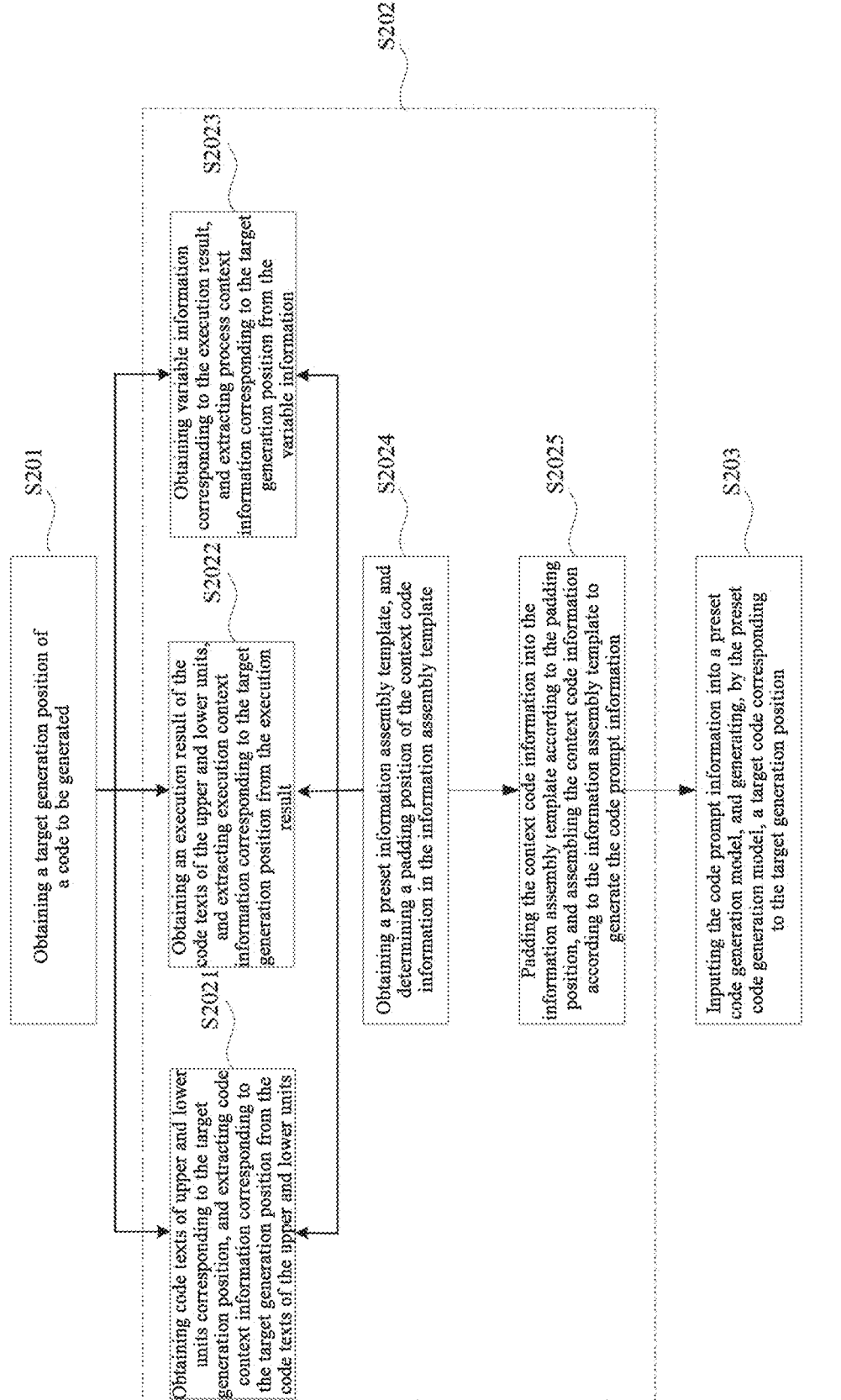
FIG. 2 is a schematic flowchart of another code generation method according to an embodiment of the present disclosure.

In this embodiment, a code generation method is provided, which can be used in computer devices such as computers, laptops, etc. FIG. 2 is a flowchart of a code generation method according to an embodiment of the present disclosure, as shown in FIG. 2, the process includes the following steps:

Step S201, obtaining a target generation position of a code to be generated. For details, please refer to the related description of the corresponding steps in the above embodiments, which will not be repeated here.

Step S202, extracting context code information corresponding to the target generation position, and generating code prompt information matching the context code information.

Specifically, the above step S202 may include:

Step S2021, obtaining code texts of upper and lower units corresponding to the target generation position, and extracting code context information corresponding to the target generation position from the code texts of the upper and lower units.

The code texts represent code written in each of upper and lower units corresponding to the target generation position, and the code context information is code extracted from the code texts of the upper and lower units. Specifically, a content retrieval component is deployed in the code development tool, which is used to extract context related information from code that has been currently written. The content retrieval component includes a unit content retrieval sub-component, and the unit content retrieval sub-component is used to extract corresponding code context information from the upper and lower units of the target generation position.

Figure 3:
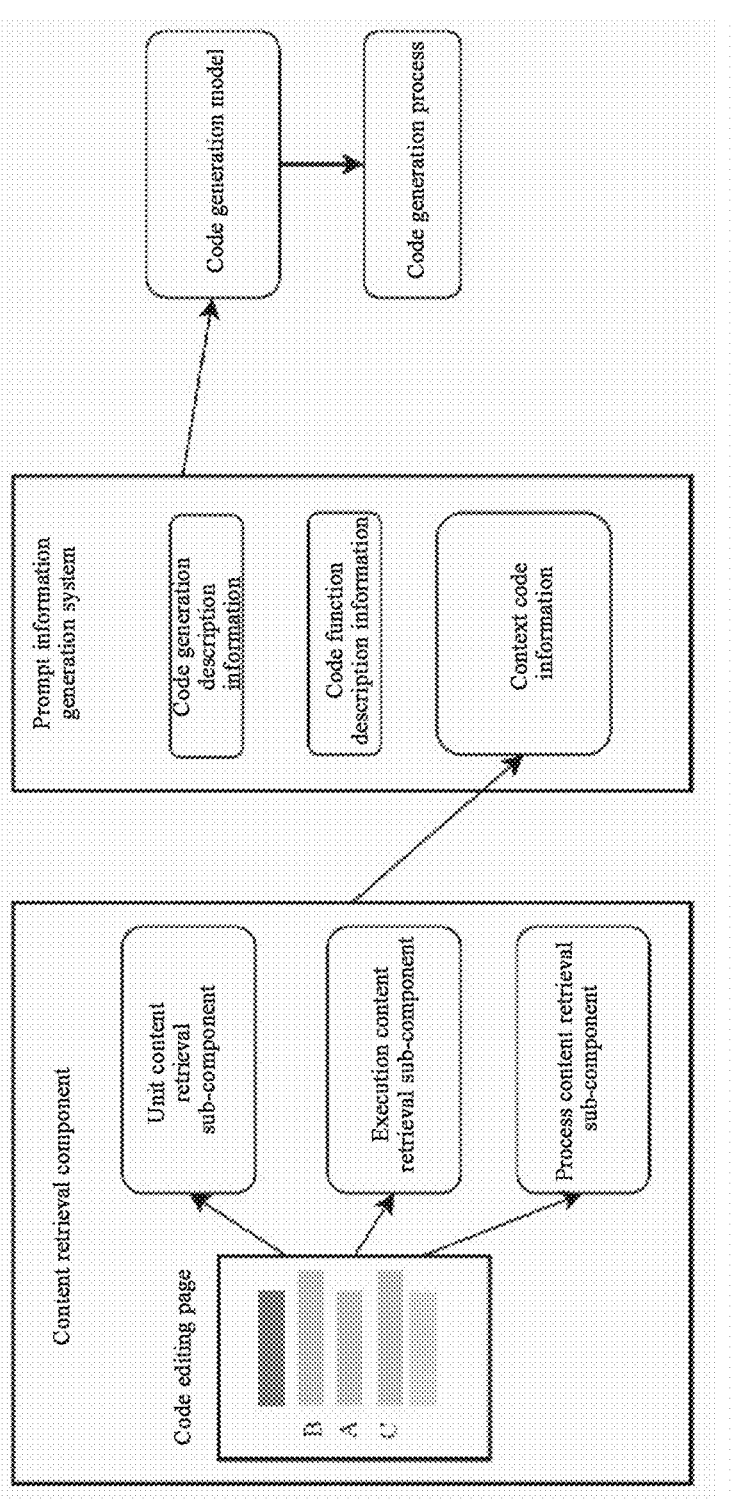
FIG. 3 is a specific schematic diagram of code generation according to an embodiment of the present disclosure.

As shown in FIG. 3, if the position of the target generation position on the code editing page is A, then the upper unit corresponding to the target generation position is B, and the corresponding lower unit is C. The unit content retrieval sub-component can extract corresponding code context information from the upper unit B and the lower unit C.

Step S2022, obtaining an execution result of the code texts of the upper and lower units, and extracting execution context information corresponding to the target generation position from the execution result.

The execution result represent result information output after the code texts are executed, and whether there is an execution error in the code texts in the upper and lower units can be determined through the execution result. The execution context information is text information extracted from the execution result to describe the execution result.

Specifically, as shown in FIG. 3, the content retrieval component includes an execution content retrieval sub-component, and the execution content retrieval sub-component is used to extract corresponding execution context information from the execution result of the upper and lower units.

If the position of the target generation position on the code editing page is A, the upper unit corresponding to the target generation position is B, and the corresponding lower unit is C, then the execution content retrieval sub-component can extract execution text information for the upper unit B from the execution result of the upper unit B, and extract execution text information for the lower unit C from the execution result of the lower unit C.

Step S2023, obtaining variable information corresponding to the execution result, and extracting process context information corresponding to the target generation position from the variable information.

The variable information represents information of various variables obtained after code execution in the upper and lower units is completed, specifically including names of the respective variables, types of the respective variables, storage data of the respective variables, etc. Specifically, after code execution in the upper and lower units is completed, the generated variable information will reside in a memory space, and the memory space is a space pre-allocated by the computer device for code execution. The process context information is text information extracted from the memory space to describe the various variables generated by the code execution.

Specifically, as shown in FIG. 3, the content retrieval component includes an execution process content retrieval sub-component, and the process content retrieval sub-component is used to retrieve variable information corresponding to the execution result of the upper and lower units from the memory space, so as to extract corresponding process context information from the variable information.

For example, if the position of the target generation position on the code editing page is A, the upper unit corresponding to the target generation position is B, and the corresponding lower unit is C, then the process content retrieval sub-component can retrieve variable information generated after code execution in the upper unit B is completed from the memory space to extract variable text information generated after code execution in the upper unit B from the variable information, and at the same time, retrieve variable information generated after code execution in the lower unit C is completed from the memory space to extract variable text information generated after code execution in the lower unit C from the variable information. The variable text information generated after code execution in the upper unit B and the variable text information generated after code execution in the lower unit C that are extracted are determined as the process context information.

Step S2024, obtaining a preset information assembly template, and determining a padding position of the context code information in the information assembly template.

The information assembly template is an information padding template preset for the context code information. The information assembly template configures corresponding placeholders for the context information, so as to assemble different context code information together through the placeholders. The padding position represents a position of the context code information in the information assembly template, and the padding position can be determined through the placeholders.

Taking the information assembly template shown in FIG. 4 as an example, the information assembly template is provided with a previous code information placement area and a subsequent code information placement area. The previous code information placement area is located above the subsequent code information placement area, and the previous code information placement area includes a previous code sub-area, a previous execution sub-area, and a previous process sub-area. Each of the previous sub-areas has a corresponding unique identifier and a placeholder, and the unique identifier and the placeholder may be in the same row or in adjacent different rows. The subsequent code information placement area includes a subsequent code sub-area, a subsequent execution sub-area, and a subsequent process sub-area. Each of the subsequent sub-areas has a corresponding unique identifier and a placeholder, and the unique identifier and the placeholder may be in the same row or in adjacent different rows.

In a specific example, the unique identifier may be formed by a combination of text and a preset symbol, such as "#previous code", "#previous execution", "#previous process", "#subsequent code", "#subsequent execution", and "#subsequent process" shown in FIG. 4. The unique identifier and its corresponding placeholder are respectively located in adjacent upper and lower rows.

As an optional implementation, the subsequent code information placement area may also be placed above the previous code information area, such as "#subsequent code", "#subsequent execution", "#subsequent process", "#previous code", "#previous execution", and "#previous process". The context information may also be arranged in sequence according to the same type, such as "#previous code", "#subsequent code", "#previous execution", "#subsequent execution", "#previous process", and "#subsequent process". The information assembly template is not specifically limited here, and those skilled in the art may set it according to actual needs.

Step S2025, padding the context code information into the information assembly template according to the padding position, and assembling the context code information according to the information assembly template to generate the code prompt information.

After the context code information is extracted, the context code information is placed in the information assembly template according to the padding position of the context code information in the information assembly template, so as to complete the assembly of the context code information. The context requirements that the code to be generated needs to meet are described with the information obtained through assembly, that is, the information generated through assembly is taken as the code prompt information for code generation. Then, the code prompt information is inputted into the preset code generation model to assist developers in automatic generation of the target code.

In some optional implementations, when generating the code prompt information, the above step S202 may further include:

Step a1, obtaining code generation description information, and determining a first assembly position of the code generation description information in the information assembly template.

Step a2, generating code function description information in response to a code function description operation, and determining a second assembly position of the code function description information in the information assembly template.

Step a3, padding the code generation description information, the code function description information, and the context code information into the information assembly template according to the first assembly position, the second assembly position, and the padding position.

Step a4, assembling the code generation description information, the code function description information, and the context code information according to the information assembly template to generate the code prompt information.

The code generation description information is text description information generated when code automatic generation is triggered, such as "#start code automatic generation process", "#enable code automatic generation assistant", etc. The first assembly position is a position of the code generation description information in the information assembly template, for example, the first assembly position is located above the context code information. As shown in FIG. 4, the information assembly template is provided with a first description information area for placing the code generation description information, and the code generation description information is in the first description information area.

Specifically, a prompt information generation system is deployed in the computer device, and the prompt information generation system is connected to the code generation tool through a communication interface, so that the code generation tool transmits the context code information extracted by the content retrieval component to the prompt information generation system through the communication interface, as shown in FIG. 3. Accordingly, when the prompt information generation system receives the context code information, the code automatic generation process is started, the prompt information generation system is triggered to generate corresponding text description information, and the text description information is determined as the code generation description information.

The code function description operation is an operation performed by developers to describe functions for the code to be generated. The code function description operation may be triggered by an input device such as a keyboard and a mouse connected to the computer device, or may be triggered by a voice component deployed in the computer device, and of course, may also be triggered by a virtual keyboard. The manner of triggering the code function description operation is not specifically limited here.

The code function description information is text information used to describe specific functions that need to be implemented by the code to be generated, such as "#generate a piece of code for implementing a quick sort function". The second assembly position is a position of the code function description information in the information assembly template, for example, the second assembly position is located below the context code information. As shown in FIG. 4, the information assembly template is provided with a second description information area for placing the code function description information, and the code function description information is in the second description information area. Specifically, after the developer triggers the code function description operation, the computer device can generate corresponding code function description information on the code editing page in response to the code function description operation of the developer.

The information assembly template is provided with a code generation description information placement area and a code function description information placement area, as shown in FIG. 4. After the code generation description information and the code function description information are obtained, the code generation description information is placed in the code generation description information placement area in the information assembly template according to the first assembly position, the code function description information is placed in the code function description information placement area according to the second assembly position, and the context code information is placed in the padding position, thereby realizing the assembly among the code generation description information, the code function description information, and the context code information to generate code prompt information for the target generation position.

In the above implementation, the code function description information, the code generation description information, and the context code information are assembled through the information assembly template, so that the description information for generating the code prompt information is more comprehensive. Then, the code prompt information is generated according to the assembled information, which greatly improves the generation accuracy of the code prompt information.

Step S203, inputting the code prompt information into a preset code generation model, and generating, by the preset code generation model, target code corresponding to the target generation position. The preset code generation model is pre-trained based on a prompt information sample. For details, please refer to the related description of the corresponding steps in the above embodiments, which will not be repeated here.

According to the code generation method provided in this embodiment, the code context information, the execution context information, and the process context information of the upper and lower units are extracted, so that the extracted context code information is more comprehensive, and the extraction accuracy of the context code information for the target generation position is ensured, thereby being able to improve the generation accuracy of the code prompt information. The code context information, the execution context information, and the process context information of the upper and lower units are assembled in combination with the information assembly template, which realizes the well-organized assembly of the context code information, avoids affecting the generation of the code prompt information due to the confusion of the assembly of the context code information, and further improves the generation accuracy of the code prompt information.

Figure 5:
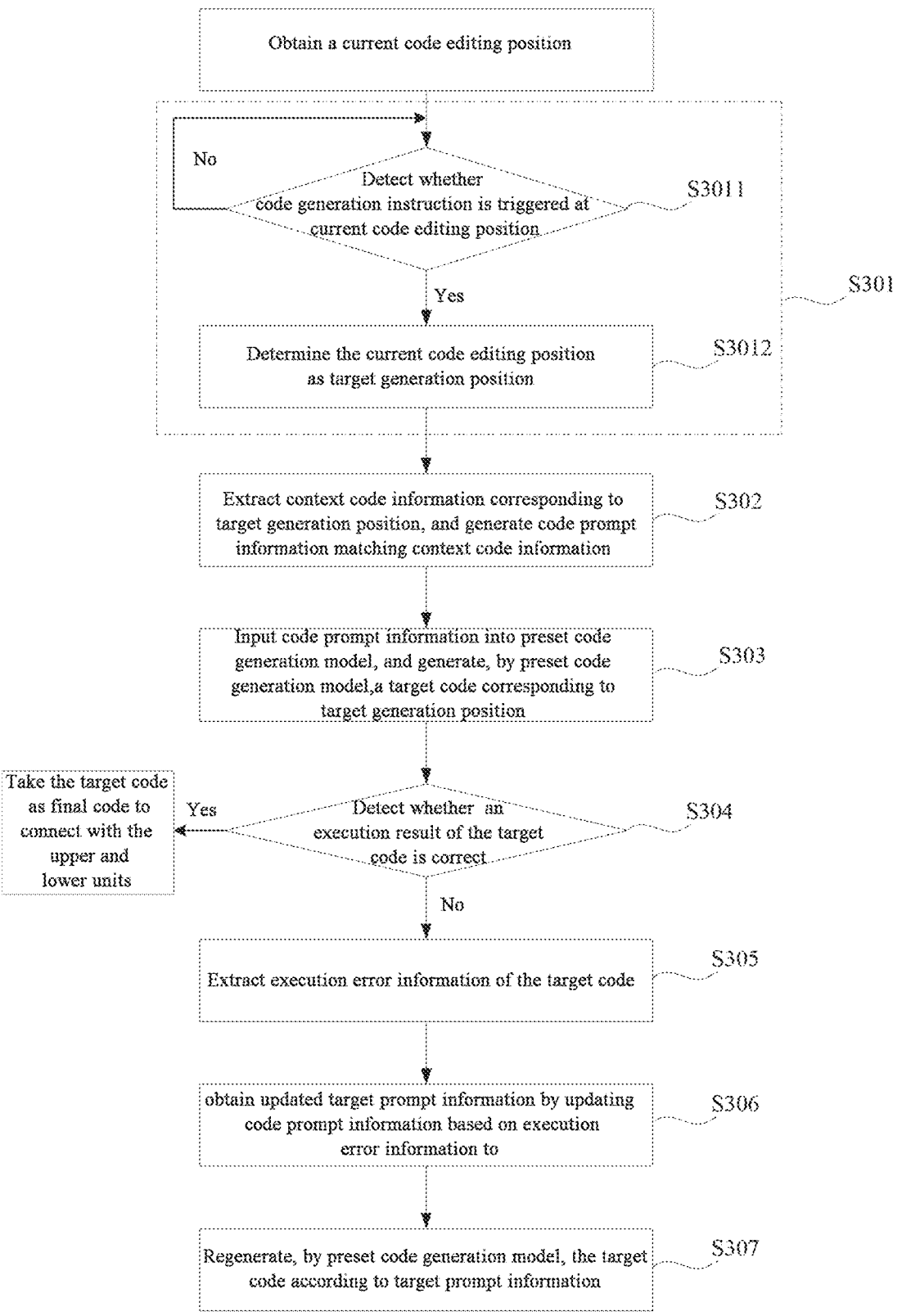
FIG. 5 is a schematic flowchart of another code generation method according to an embodiment of the present disclosure.

In this embodiment, a code generation method is provided, which can be used in computer devices such as computers, laptops, etc. FIG. 5 is a flowchart of a code generation method according to an embodiment of the present disclosure, as shown in FIG. 5, the process includes the following steps:

Step S301, obtaining a target generation position of a code to be generated.

Specifically, the above step S301 may include:

Step S3011, detecting whether a code generation instruction is triggered at a current code editing position.

The current code editing position is a real-time editing position of developers. The code generation instruction is an instruction triggered by developers to automatically generate code, and the code generation instruction may be triggered through a keyboard shortcut, or may be triggered by inputting code function description information by developers, or may be triggered through a code generation icon (label) on a code editing page. The manner of triggering the code generation instruction is not specifically limited here, and those skilled in the art may determine it according to actual needs.

When it is difficult for developers to complete the development of code for specific functions at the current code editing position, in order to ensure the development process of the software code, the code generation instruction may be triggered at the current code editing position to start a code automatic generation process. Therefore, in the process of code development by developers through a code editing interface of a code generation tool, it can be detected in real time whether the code generation instruction is triggered at the current code editing position. If it is detected that the code generation instruction is triggered, step S3012 is executed, otherwise the detection of code development continues.

Step S3012, if the code generation instruction is triggered at the current code editing position, determining the current code editing position as the target generation position.

If the code generation instruction is triggered at the current code editing position, it means that the developer needs to execute the code automatic generation process at the current code editing position, and the current code editing position that needs to perform code automatic generation is determined as the target generation position of the code to be generated.

Step S302, extracting context code information corresponding to the target generation position, and generating code prompt information matching the context code information. For details, please refer to the related description of the corresponding steps in the above embodiments, which will not be repeated here.

Step S303, inputting the code prompt information into a preset code generation model, and generating, by the preset code generation model, target code corresponding to the target generation position. The preset code generation model is pre-trained based on a prompt information sample.

Step S304, detecting whether an execution result of the target code is correct.

After the generation of the target code is completed, an execution process of the target code is entered to generate an execution result of the target code. The execution result may include a code execution log, a warning, an error message, etc. The execution state of the target code is determined through the execution result. Therefore, by parsing the information contained in the execution result, whether the execution result of the target code is correct can be determined. When the execution result of the target code is incorrect, step S305 is executed. When the execution result of the target code is correct, the target code is taken as the final code to connect with the upper and lower units, so as to implement specific functions through the target code.

Step S305, when the execution result of the target code is incorrect, extracting execution error information of the target code.

The execution error information is text information that describes code execution errors. When the execution result of the target code is incorrect, it means that the currently generated target code has errors, that is, the target code needs to be further optimized. At this time, in order to optimize the target code so that the preset code generation model can generate correct target code, the execution error information can be extracted from the execution result.

Step S306, obtaining updated target prompt information by updating the code prompt information based on the execution error information.

The target prompt information is text description information used for generating code. Specifically, the execution error information is taken as supplementary information of the code prompt information, and the supplementary information is updated to the code prompt information to generate corresponding target prompt information, so as to avoid the preset code generation model from generating the incorrect target code again.

Step S307, regenerating the target code by the preset code generation model according to the target prompt information.

The target prompt information is inputted into the preset code generation model to request code generation for the target prompt information from the preset code generation model. Specifically, in the process of regenerating the target code according to the target prompt information, the target code with execution errors will be inputted into the preset code generation model as the target prompt information, so that the preset code generation model optimizes the target code with execution errors according to the target prompt information, and generates code matching the target prompt information.

In some optional implementations, the above method may further include:

Step b1, detecting a number of errors in the execution result.

Step b2, when the number of errors reaches a preset number, generating adjusted target code in response to an adjustment operation on the target code.

The number of errors is the number of consecutive errors in the execution of the target code for implementing the same specific function by the preset code generation model. Specifically, every time the preset code generation model outputs the target code once, the target code is executed once. The number of errors in the execution of the target code is counted in combination with the execution result of the target code.

The preset number is a preset maximum number of execution errors allowed, for example, 3, and the preset number is not specifically limited here. Every time the target code has an error, the number of errors will be accumulated once. The number of errors generated in the current code automatic generation is compared with the preset number to determine whether the number of errors reaches the preset number. When the number of errors reaches the preset number, it means that it is difficult for the preset code generation model to automatically generate correct target code that matches the target generation position. At this time, reminder information can be generated, and developers are reminded to intervene through the reminder information, so that developers can adjust the automatically generated target code to obtain target code that meets requirements. When the number of errors does not reach the preset number, the generated target code can be optimized in combination with the execution error information, so that the generated target code tends to be correct.

In the above implementation, after the number of errors in the execution result reaches the preset number, it means that there is a problem in the generation of the target code. At this time, developers can adjust the target code, so that error information of the target code can be processed in time, thereby avoiding affecting the subsequent development and execution of software code.

In some optional implementations, after generating the target code corresponding to the target generation position, the method further includes: padding the target code generated by the preset code generation model to the target generation position. Specifically, after the preset code generation model outputs the target code, the target code outputted by the preset code generation model is placed at the target generation position, so as to realize the connection of the target code with the code of the upper and lower units on the basis of implementing specific functions through the target code.

After the target code is generated, the target code is directly padded to the target position, so as to connect with the code of the upper and lower units and ensure the integrity of the software code.

In some optional implementations, after generating the target code corresponding to the target generation position, the method further includes: creating a new code generation position, and padding the target code generated by the preset code generation model to the created new code generation position.

The code generation position is a position created for the target code to place the target code. When a code automatic generation process for the target generation position is started, the code generation position corresponding to the target generation position is created, and the target code outputted by the preset code generation model is placed at the created new code generation position. After it is determined that the execution result of the target code is correct, the target code at the code generation position is placed to the target generation position.

After the target code is generated, the target code is padded to the created new code generation position, and after it is determined that the execution result of the target code is correct, the target code is placed to the target generation position. Thus, it can be avoided that the target code with an execution error is directly inserted into the target generation position, which affects the execution of code in other units. Therefore, both the generation accuracy of the target code and the integrity of the software code can be taken into account at the same time.

According to the code generation method provided in this embodiment, the triggering of the code generation instruction is combined to determine the corresponding target generation position, which realizes the effective determination of the target generation position. After the target code is generated, the execution result of the target code is detected, so that the code prompt information can be optimized according to the execution result, thereby realizing the optimization of the target code, and greatly improving the optimization accuracy of the target code.

In this embodiment, a code generation apparatus is further provided, and the apparatus is used to implement the above embodiments and preferred implementations, which will not be repeated. As used below, the term "module" may implement a combination of software and/or hardware with pre-determined functions. Although the apparatus described in the following embodiments is preferably implemented in software, the implementation of hardware, or a combination of software and hardware is also possible and contemplated.

Figure 6:
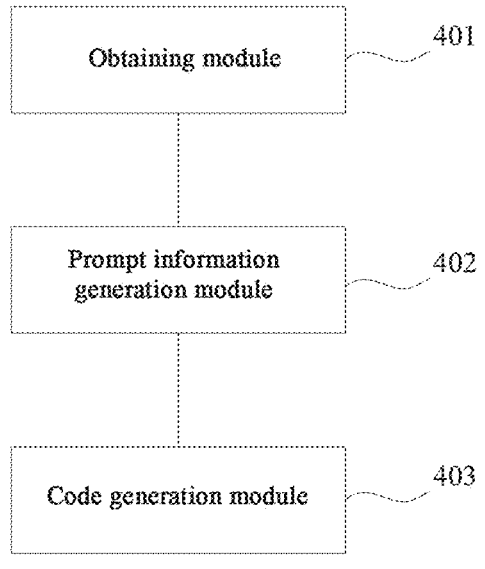
FIG. 6 is a structural block diagram of a code generation apparatus according to an embodiment of the present disclosure.

This embodiment provides a code generation apparatus, as shown in FIG. 6, including:

an obtaining module 401, configured to obtain a target generation position of a code to be generated;

a prompt information generation module 402, configured to extract context code information corresponding to the target generation position, and generate code prompt information matching the context code information; and a code generation module 403, configured to input the code prompt information into a preset code generation model, and generate, by the preset code generation model, target code corresponding to the target generation position, where the preset code generation model is pre-trained based on a prompt information sample.

In some optional implementations, the above obtaining module 401 may include:

a detection unit, configured to detect whether a code generation instruction is triggered at a current code editing position; and a position determination unit, configured to determine the current code editing position as the target generation position if the code generation instruction is triggered at the current code editing position.

In some optional implementations, the above prompt information generation module 402 may include:

a code content extraction unit, configured to obtain code texts of upper and lower units corresponding to the target generation position, and extract code context information corresponding to the target generation position from the code texts of the upper and lower units;

an execution content extraction unit, configured to obtain an execution result of the code texts of the upper and lower units, and extract execution context information corresponding to the target generation position from the execution result; and a process content extraction unit, configured to obtain variable information corresponding to the execution result, and extract process context information corresponding to the target generation position from the variable information.

In some optional implementations, the above prompt information generation module 402 may further include:

a padding position determination unit, configured to obtain a preset information assembly template, and determine a padding position of the context code information in the information assembly template; and an assembly unit, configured to pad the context code information into the information assembly template according to the padding position, and assemble the context code information according to the information assembly template to generate the code prompt information.

In some optional implementations, the above prompt information generation module 402 may further include:

a generation description information obtaining unit, configured to obtain code generation description information, and determine a first assembly position of the code generation description information in the information assembly template;

a function description information generation unit, configured to generate code function description information in response to a code function description operation, and determine a second assembly position of the code function description information in the information assembly template;

a padding unit, configured to pad the code generation description information, the code function description information, and the context code information into the information assembly template according to the first assembly position, the second assembly position, and the padding position; and an information assembly unit, configured to assemble the code generation description information, the code function description information, and the context code information according to the information assembly template to generate the code prompt information.

In some optional implementations, the above apparatus may further include:

an execution detection module, configured to detect whether an execution result of the target code is correct;

an error information extraction module, configured to extract execution error information of the target code when the execution result of the target code is incorrect;

an update module, configured to obtain updated target prompt information by updating the code prompt information based on the execution error information; and an optimization module, configured to regenerate the target code by the preset code generation model according to the target prompt information.

In some optional implementations, the above apparatus may further include:

an error number obtaining module, configured to detect a number of errors in the execution result; and an adjustment module, configured to generate adjusted target code in response to an adjustment operation on the target code when the number of errors reaches a preset number.

In some optional implementations, the above apparatus may further include:

a target code padding module, configured to pad the target code generated by the preset code generation model to the target generation position, or create a new code generation position, and pad the target code generated by the preset code generation model to the created new code generation position.

The code generation apparatus in this embodiment is presented in the form of functional units, where the units here refer to an ASIC circuit, a processor and a memory that execute one or more software or fixed programs, and/or other devices that can provide the above functions.

Further functional descriptions of the above modules and units are the same as those in the above corresponding embodiments, and will not be repeated here.

According to the code generation apparatus provided in this embodiment, the context code information of the target generation position is extracted to generate the corresponding code prompt information according to the context code information, which realizes the automatic generation of the code prompt information without relying on manual input of description information. Moreover, the code prompt information is generated in combination with the context code information, which ensures that the generation of the code prompt information is more accurate. Then, the target code is generated by the preset code generation model according to the code prompt information, thereby improving the generation accuracy and generation efficiency of the target code, and further improving the development efficiency of the software code.

The embodiments of the present disclosure further provide a computer device, which has the code generation apparatus shown in FIG. 6 above.

Figure 7:
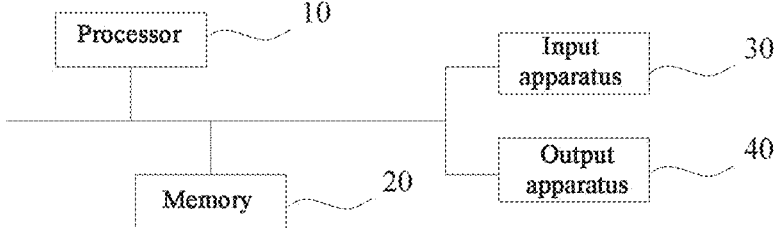
FIG. 7 is a schematic structural diagram of hardware of a computer device according to an embodiment of the present disclosure.

Please refer to FIG. 7, which is a schematic structural diagram of a computer device according to an optional embodiment of the present disclosure. As shown in FIG. 7, the computer device includes: one or more processors 10, a memory 20, and interfaces for connecting components, including high-speed interfaces and low-speed interfaces. The components communicate with each other through different buses and can be installed on a public main board or in other manners as required. The processor can process instructions executed in the computer device, including instructions for storing in the memory or on the memory to display graphic information of a GUI on an external input/output apparatus (such as a display device coupled to the interface). In some optional implementations, if necessary, multiple processors and/or multiple buses can be used together with multiple memories. Similarly, multiple computer devices can be connected, and each device provides part of necessary operations (e.g., as a server array, a group of blade servers, or a multi-processor system). In FIG. 7, one processor 10 is taken as an example.

The processor 10 may be a central processing unit, a network processor, or a combination thereof. The processor 10 may further include a hardware chip. The hardware chip may be an application-specific integrated circuit, a programmable logic device, or a combination thereof. The programmable logic device may be a complex programmable logic device, a field programmable logic gate array, a general-purpose array logic, or any combination thereof.

The memory 20 stores instructions executable by at least one processor 10, so that the at least one processor 10 executes the method shown in the above embodiments.

The memory 20 may include a program storage area and a data storage area, where the program storage area may store an operating system and applications required for at least one function; and the data storage area may store data created according to the use of the computer device in terms of the display of an applet landing page. In addition, the memory 20 may include a high-speed random access memory, and may also include a non-transitory memory, such as at least one magnetic disk storage device, flash memory device, or other non-transitory solid-state storage device. In some optional implementations, the memory 20 optionally includes a memory provided remotely relative to the processor 10, and these remote memories may be connected to the computer device via a network. Examples of the above network include but are not limited to the Internet, an intranet, a local area network, a mobile communication network, and a combination thereof.

The memory 20 may include a volatile memory, such as a random access memory; the memory may also include a non-volatile memory, such as a flash memory, a hard disk, or a solid-state disk; and the memory 20 may also include a combination of the above kinds of memories.

The computer device further includes an input apparatus 30 and an output apparatus 40. The processor 10, the memory 20, the input apparatus 30, and the output apparatus 40 may be connected through a bus or in other manners. In FIG. 7, connection through a bus is taken as an example.

The input apparatus 30 may receive input digital or character information, and generate key signal input related to user settings and function control of the computer device, such as a touchscreen, a keypad, a mouse, a trackpad, a touchpad, an indicator bar, one or more mouse buttons, a trackball, a joystick, etc. The output apparatus 40 may include a display device, an auxiliary lighting apparatus (e.g., an LED), and a tactile feedback apparatus (e.g., a vibration motor). The above display device includes but is not limited to a liquid crystal display, a light emitting diode, a display, and a plasma display. In some optional implementations, the display device may be a touchscreen.

The computer device further includes a communication interface for communicating with other devices or communication networks.

The embodiments of the present disclosure further provide a computer-readable storage medium, and the method according to the embodiments of the present disclosure may be implemented in hardware, firmware, or implemented as computer code that can be recorded on a storage medium, or implemented by being downloaded from a network and originally stored in a remote storage medium or a non-transitory machine-readable storage medium and will be stored in a local storage medium. Thus, the method described herein may be stored in such software processing on a storage medium using a general computer, a dedicated processor, or programmable or dedicated hardware. The storage medium may be a magnetic disk, an optical disk, a read-only memory, a random access memory, a flash memory, a hard disk, a solid-state disk, etc. Further, the storage medium may also include a combination of the above kinds of memories. It can be understood that a computer, a processor, a microprocessor controller, or programmable hardware includes a storage component that can store or receive software or computer code, and when the software or computer code is accessed and executed by the computer, the processor, or the hardware, the method shown in the above embodiments is implemented.

Although the embodiments of the present disclosure are described with reference to the drawings, those skilled in the art can make various modifications and variations without departing from the spirit and scope of the present disclosure. Such modifications and variations are all within the scope defined by the appended claims.

We claim:

1. A code generation method, comprising:

obtaining a target generation position of a code to be generated, wherein the target generation position is a position of a code editing page stored in a memory;

extracting context code information corresponding to the target generation position, wherein the context code information comprises code information of upper and lower units corresponding to the target generation position;

generating code prompt information matching the context code information, wherein the code prompt information comprises code generation description information, code function description information, and the context code information; and inputting the code prompt information into a preset code generation model, and generating, by the preset code generation model, a target code corresponding to the target generation position, wherein the preset code generation model is pre-trained based on a prompt information sample;

wherein extracting the context code information corresponding to the target generation position comprises:

obtaining code texts of the upper and lower units corresponding to the target generation position, and extracting the context code information corresponding to the target generation position from the code texts of the upper and lower units;

and/or obtaining an execution result of the code texts of the upper and lower units, and extracting execution context information corresponding to the target generation position from the execution result of the code texts;

and/or obtaining variable information corresponding to the execution result of the code texts, and extracting process context information corresponding to the target generation position from the variable information;

wherein generating the code prompt information matching the context code information comprises:

obtaining a preset information assembly template, and determining a padding position of the context code information in the information assembly template; and padding the context code information into the information assembly template according to the padding position, and assembling the context code information according to the information assembly template to generate the code prompt information; and wherein the method further comprises:

determining a first assembly position of the code generation description information in the information assembly template;

determining a second assembly position of the code function description information in the information assembly template, wherein the code function description information is generated in response to a code function description operation;

padding the code generation description information, the code function description information, and the context code information into the information assembly template according to the first assembly position, the second assembly position, and the padding position; and assembling the code generation description information, the code function description information, and the context code information according to the information assembly template to generate the code prompt information.

2. The method of claim 1, wherein obtaining the target generation position of the code to be generated comprises:

detecting whether a code generation instruction is triggered at a current code editing position; and in response to the code generation instruction being triggered at the current code editing position, determining the current code editing position as the target generation position.

3. The method of claim 1, wherein, after generating, by the preset code generation model, the target code corresponding to the target generation position, the method comprises:

detecting whether an execution result of the target code is correct;

in response to the execution result of the target code being incorrect, extracting execution error information of the target code;

obtaining updated target prompt information by updating the code prompt information based on the execution error information; and regenerating, by the preset code generation model, the target code according to the target prompt information.

4. The method of claim 3, further comprising:

detecting a number of errors in the execution result of the target code; and in response to the number of errors reaching a preset number, generating the adjusted target code in response to an adjustment operation on the target code.

5. The method of claim 3, wherein, after generating, by the preset code generation model, the target code corresponding to the target generation position, the method further comprises:

padding the target code generated by the preset code generation model to the target generation position;

and/or, creating a new code generation position, and padding the target code generated by the preset code generation model to the created new code generation position.

6. A computer device, comprising:

a memory and a processor, the memory and the processor being communicatively connected to each other, the memory storing computer instructions, and the computer instructions, when executed by the processor, cause the processor to:

obtain a target generation position of a code to be generated, wherein the target generation position is a position of a code editing page stored in the memory;

extract context code information corresponding to the target generation position, wherein the context code information comprises code information of upper and lower units located at the target generation position;

generate code prompt information matching the context code information, wherein the code prompt information comprises code generation description information, code function description information, and the context code information; and input the code prompt information into a preset code generation model, and generate, by the preset code generation model, a target code corresponding to the target generation position, wherein the preset code generation model is pre-trained based on a prompt information sample;

wherein the computer instructions for extracting the context code information corresponding to the target generation position, further cause the processor to:

obtain code texts of the upper and lower units corresponding to the target generation position, and extract the context code information corresponding to the target generation position from the code texts of the upper and lower units;

and/or obtain an execution result of the code texts of the upper and lower units, and extract execution context information corresponding to the target generation position from the execution result of the code texts;

and/or obtain variable information corresponding to the execution result of the code texts, and extract process context information corresponding to the target generation position from the variable information;

wherein the computer instructions for generating the code prompt information matching the context code information, further cause the processor to:

obtain a preset information assembly template, and determining a padding position of the context code information in the information assembly template; and pad the context code information into the information assembly template according to the padding position, and assemble the context code information according to the information assembly template to generate the code prompt information; and wherein the computer instructions further cause the processor to:

determine a first assembly position of the code generation description information in the information assembly template;

determine a second assembly position of the code function description information in the information assembly template, wherein the code function description information is generated in response to a code function description operation;

pad the code generation description information, the code function description information, and the context code information into the information assembly template according to the first assembly position, the second assembly position, and the padding position; and assemble the code generation description information, the code function description information, and the context code information according to the information assembly template to generate the code prompt information.

7. The computer device of claim 6, wherein the computer instructions for obtaining the target generation position of the code to be generated, further cause the processor to:

detect whether a code generation instruction is triggered at a current code editing position; and in response to the code generation instruction being triggered at the current code editing position, determine the current code editing position as the target generation position.

8. The computer device of claim 6, wherein, after generating, by the preset code generation model, the target code corresponding to the target generation position, the computer instructions further cause the processor to:

detect whether an execution result of the target code is correct;

in response to the execution result of the target code being incorrect, extract execution error information of the target code;

obtaining updated target prompt information by updating the code prompt information based on the execution error information; and regenerate, by the preset code generation model, the target code according to the target prompt information.

9. The computer device of claim 8, wherein the computer instructions further cause the processor to:

detect a number of errors in the execution result of the target code; and in response to the number of errors reaching a preset number, generate the adjusted target code in response to an adjustment operation on the target code.

10. The computer device of claim 8, wherein, after generating, by the preset code generation model, the target code corresponding to the target generation position, the computer instructions further cause the processor to:

pad the target code generated by the preset code generation model to the target generation position;

and/or, create a new code generation position, and pad the target code generated by the preset code generation model to the created new code generation position.

11. A non-transitory computer-readable storage medium, storing computer instructions thereon, wherein the computer instructions, when executed by a processor, cause the processor to:

obtain a target generation position of a code to be generated, wherein the target generation position is a position of a code editing page stored in a memory;

extract context code information corresponding to the target generation position, wherein the context code information comprises code information of upper and lower units corresponding to the target generation position;

generate code prompt information matching the context code information, wherein the code prompt information comprises code generation description information, code function description information, and the context code information; and input the code prompt information into a preset code generation model, and generate, by the preset code generation model, a target code corresponding to the target generation position, wherein the preset code generation model is pre-trained based on a prompt information sample;

wherein the computer instructions for extracting the context code information corresponding to the target generation position, further cause the processor to:

obtain code texts of the upper and lower units corresponding to the target generation position, and extract the context code information corresponding to the target generation position from the code texts of the upper and lower units;

and/or obtain an execution result of the code texts of the upper and lower units, and extract execution context information corresponding to the target generation position from the execution result of the code texts;

and/or obtain variable information corresponding to the execution result of the code texts, and extract process context information corresponding to the target generation position from the variable information;

wherein the computer instructions for generating the code prompt information matching the context code information, further cause the processor to:

obtain a preset information assembly template, and determining a padding position of the context code information in the information assembly template; and pad the context code information into the information assembly template according to the padding position, and assemble the context code information according to the information assembly template to generate the code prompt information; and wherein the computer instructions further cause the processor to:

determine a first assembly position of the code generation description information in the information assembly template;

determine a second assembly position of the code function description information in the information assembly template, wherein the code function description information is generated in response to a code function description operation;

pad the code generation description information, the code function description information, and the context code information into the information assembly template according to the first assembly position, the second assembly position, and the padding position; and assemble the code generation description information, the code function description information, and the context code information according to the information assembly template to generate the code prompt information.

12. The non-transitory computer-readable storage medium of claim 11, wherein the computer instructions for obtaining the target generation position of the code to be generated, further cause the processor to:

detect whether a code generation instruction is triggered at a current code editing position; and in response to the code generation instruction being triggered at the current code editing position, determine the current code editing position as the target generation position.

\* \* \* \* \*